(12) United States Patent
Kim et al.

(10) Patent No.: US 12,695,104 B2
(45) Date of Patent: Jul. 28, 2026

(54) FUEL CELL ELECTRIC VEHICLE AND METHOD OF CONTROLLING SAME

(71) Applicants: Hyundai Motor Company, Seoul (KR); Kia Corporation, Seoul (KR)

(72) Inventors: Mi Ji Kim, Gwacheon-si (KR); Joo Yeon Kim, Seoul (KR); Seong Cheol Jeong, Suwon-si (KR); Jae Ok Ha, Yongin-su (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 746 days.

(21) Appl. No.: 18/178,102

(22) Filed: Mar. 3, 2023

(65) Prior Publication Data

US 2024/0178419 A1 May 30, 2024

(30) Foreign Application Priority Data

Nov. 24, 2022 (KR) ........................ 10-2022-0159261

(51) Int. Cl.
| | |
|---|---|
| *H01M 8/04* | (2016.01) |
| *H01M 8/04537* | (2016.01) |
| *H01M 8/04858* | (2016.01) |
| *H01M 16/00* | (2006.01) |

(52) U.S. Cl.
CPC ... *H01M 8/04619* (2013.01); *H01M 8/04626* (2013.01); *H01M 8/0494* (2013.01); *H01M 16/006* (2013.01); *H01M 2250/20* (2013.01)

(58) Field of Classification Search
CPC ......... H01M 8/04619; H01M 8/04626; H01M 8/0494; H01M 16/006; H01M 2250/20; B60L 58/40; B60L 58/30; B60L 58/12
USPC .......................................................... 429/9
See application file for complete search history.

(56) References Cited

U.S. PATENT DOCUMENTS

| | | | |
|---|---|---|---|
| 2015/0217660 A1* | 8/2015 | Manabe ............ | H01M 8/04619 |
| | | | 307/23 |
| 2017/0005488 A1* | 1/2017 | Suzuki .................... | B60L 58/12 |
| 2020/0072911 A1* | 3/2020 | Koga .................... | H01M 4/485 |
| 2020/0379050 A1* | 12/2020 | Imanaka .............. | G01R 31/007 |
| 2022/0203908 A1* | 6/2022 | Bhimani .............. | B60W 20/13 |

* cited by examiner

*Primary Examiner* — James M Erwin

(74) *Attorney, Agent, or Firm* — Slater Matsil, LLP

(57) ABSTRACT

An embodiment method of controlling a fuel cell electric vehicle includes determining a required output power amount of a fuel cell stack from a total required output power amount of a battery and the fuel cell stack based on an output power distribution ratio of the fuel cell stack according to a current state of charge (SOC) value of the battery and controlling an operation of the fuel cell stack based on the required output power amount of the fuel cell stack.

20 Claims, 5 Drawing Sheets

FIG. 1

FUEL CELL ELECTRIC VEHICLE AND METHOD OF CONTROLLING SAME

CROSS-REFERENCE TO RELATED APPLICATIONS

This application claims the benefit of Korean Patent Application No. 10-2022-0159261, filed on Nov. 24, 2022, which application is hereby incorporated herein by reference.

TECHNICAL FIELD

The present invention relates to a fuel cell electric vehicle and a method of controlling the same.

BACKGROUND

Recently, with growing interest in the environment, eco-friendly vehicles that have an electric motor as a power source are increasing. Eco-friendly vehicles are also referred to as electrified vehicles, and a representative example thereof is a hybrid electric vehicle (HEV), an electric vehicle (EV), or a fuel cell electric vehicle (FCEV).

In general, a fuel cell electric vehicle is provided with an energy storage device such as a high-voltage battery and a fuel cell stack as energy sources. In order to increase the efficiency and durability of the fuel cell electric vehicle, output power amounts of the high-voltage battery and the fuel cell stack may be appropriately distributed.

For example, when a driving motor is driven only with the output power of the fuel cell stack, the amount of fuel used increases and regenerative braking energy cannot be recovered, resulting in low energy efficiency. On the contrary, when the driving motor is driven only with the output power of the high-voltage battery, there is a limitation in motoring and regenerative braking energy recovery due to a limited battery capacity. Furthermore, since only the battery is responsible for charging or discharging, a problem may occur in durability of the battery.

To overcome the above problems, it is conceivable to adopt a method in which in a section where the output power of the driving motor is less than a set output power (i.e., a low output section), the required output power of the driving motor is satisfied with the output power of the high-voltage battery, and in a section where the output power of the driving motor is equal to or greater than the set output power (i.e., a high output section), the required output power of the driving motor is satisfied by distributing the output powers of the high-voltage battery and the fuel cell stack according to an output power distribution ratio, thereby increasing the driving efficiency of the fuel cell electric vehicle.

However, some problems still reside. That is, since distributing the output powers of the high-voltage battery and the fuel cell stack is based on a predetermined output power distribution ratio, the required output power of the driving motor may not be satisfied depending on the state of charge (SOC) or discharge limit of the high-voltage battery. Also, the output power of the fuel cell stack may increase discontinuously under the condition in which the output power of the driving motor is equal to the set output power.

The foregoing is intended merely to aid in the understanding of the background of embodiments of the present invention and is not intended to mean that the present invention falls within the purview of the related art that is already known to those skilled in the art.

SUMMARY

The present invention relates to a fuel cell electric vehicle and a method of controlling the same. Particular embodiments relate to a fuel cell electric vehicle and a method of controlling the same that distribute output power amounts of a fuel cell stack and a battery according to an output power distribution ratio.

Accordingly, embodiments of the present invention have been made keeping in mind problems occurring in the related art, and an embodiment of the present invention stably manages a state of charge (SOC) of a battery and satisfies a required output power of a driving motor regardless of the SOC of the battery by setting required output power amounts of a fuel cell stack and the battery on the basis of an output power distribution ratio according to the SOC of the battery.

Another embodiment of the present invention stabilizes an output power of a fuel cell stack under the condition in which an output power of a driving motor is equal to a set output power by controlling an output power distribution ratio to be linearized.

Another embodiment of the present invention satisfies a required output power of a driving motor regardless of a discharge limit of a battery by correcting a required output power amount of a fuel cell stack according to a dischargeable amount of the battery.

The embodiments of the present invention are not limited to those mentioned above, and other embodiments not mentioned will be clearly understood by those skilled in the art from the description provided hereinafter.

According to one embodiment of the present invention, there is provided a method of controlling a fuel cell electric vehicle, the method including determining a required output power amount of a fuel cell stack from a total required output power amount of a battery and the fuel cell stack on the basis of an output power distribution ratio of the fuel cell stack according to a current SOC value of the battery and controlling an operation of the fuel cell stack on the basis of the required output power amount of the fuel cell stack.

In an embodiment, the method may further include determining the total required output power amount by adding a required output power amount of a driving motor and a power consumption amount of a balance of plant (BoP).

In an embodiment, the method may further include determining the output power distribution ratio on the basis of a target SOC error value of the battery and the total required output power amount. The target SOC error value may correspond to a value obtained by subtracting the current SOC value from the target SOC value of the battery.

In an embodiment, the determining of the output power distribution ratio may include adjusting the output power distribution ratio to become higher as the target SOC error value increases.

In an embodiment, the determining of the output power distribution ratio may include controlling the output power distribution ratio to be linearized on the basis of the total required output power amount.

In an embodiment, the determining of the required output power amount of the fuel cell stack may be performed to determine the required output power amount of the fuel cell stack by multiplying the total required output power amount by the output power distribution ratio.

In an embodiment, the controlling of the operation of the fuel cell stack may include determining a corrected required output power amount of the fuel cell stack by adding an output power correction amount of the fuel cell stack according to a dischargeable amount of the battery to the required output power amount of the fuel cell stack and controlling the operation of the fuel cell stack on the basis of the corrected required output power amount.

In an embodiment, the method may further include setting the output power correction amount by subtracting the dischargeable amount of the battery from a required output power amount of the battery when the required output power amount of the battery exceeds the dischargeable amount of the battery and setting the output power correction amount to '0' when the required output power amount of the battery is less than or equal to the dischargeable amount.

In an embodiment, the method may further include determining the required output power amount of the battery by subtracting the required output power amount of the fuel cell stack from the total required output power amount.

According to another embodiment of the present invention, there is provided a fuel cell electric vehicle including a fuel cell stack, a battery, and a controller configured to determine a required output power amount of the fuel cell stack from a total required output power amount of the battery and the fuel cell stack on the basis of an output power distribution ratio of the fuel cell stack according to a current SOC value of the battery and to control an operation of the fuel cell stack on the basis of the required output power amount of the fuel cell stack.

In an embodiment, the controller may determine the total required output power amount by adding a required output power amount of a driving motor and a power consumption amount of a BoP.

In an embodiment, the controller may determine the output power distribution ratio on the basis of a target SOC error value of the battery and the total required output power amount, and the target SOC error value may correspond to a value obtained by subtracting the current SOC value from the target SOC value of the battery.

In an embodiment, the controller may adjust the output power distribution ratio to become higher as the target SOC error value increases.

In an embodiment, the controller may control the output power distribution ratio to be linearized on the basis of the total required output power amount.

In an embodiment, the controller may determine the required output power amount of the fuel cell stack by multiplying the total required output power amount by the output power distribution ratio.

In an embodiment, the controller may determine a corrected required output power amount of the fuel cell stack by adding an output power correction amount of the fuel cell stack according to a dischargeable amount of the battery to the required output power amount of the fuel cell stack and control the operation of the fuel cell stack on the basis of the corrected required output power amount.

In an embodiment, when a required output power amount of the battery exceeds the dischargeable amount of the battery, the controller may set the output power correction amount by subtracting the dischargeable amount of the battery from the required output power amount of the battery, and when the required output power amount of the battery is less than or equal to the dischargeable amount, the controller may set the output power correction amount to '0'.

In an embodiment, the controller may determine the required output power amount of the battery by subtracting the required output power amount of the fuel cell stack from the total required output power amount.

According to embodiments of the present invention, by setting the required output power amounts of the fuel cell stack and the battery on the basis of the output power distribution ratio according to the SOC of the battery, it is possible to stably manage the SOC of the battery and satisfy the required output power of the driving motor regardless of the SOC of the battery.

In addition, by controlling the output power distribution ratio to be linearized, it is possible to stabilize the output power of the fuel cell stack under the condition in which the output power of the driving motor is equal to the set output power.

In addition, by correcting the required output power amount of the fuel cell stack according to the dischargeable amount of the battery, it is possible to satisfy the required output power of the driving motor regardless of the discharge limit of the battery.

The embodiments of the present invention are not limited to those mentioned above, and other embodiments not mentioned will be clearly understood by those skilled in the art from the description provided hereinafter.

BRIEF DESCRIPTION OF THE DRAWINGS

The above and other objectives, features, and other advantages of embodiments of the present invention will be more clearly understood from the following detailed description when taken in conjunction with the accompanying drawings, in which:

FIG. 1 is a block diagram illustrating the configuration of a power system of a fuel cell electric vehicle according to an embodiment of the present invention;

DETAILED DESCRIPTION OF ILLUSTRATIVE EMBODIMENTS

Figure 2:
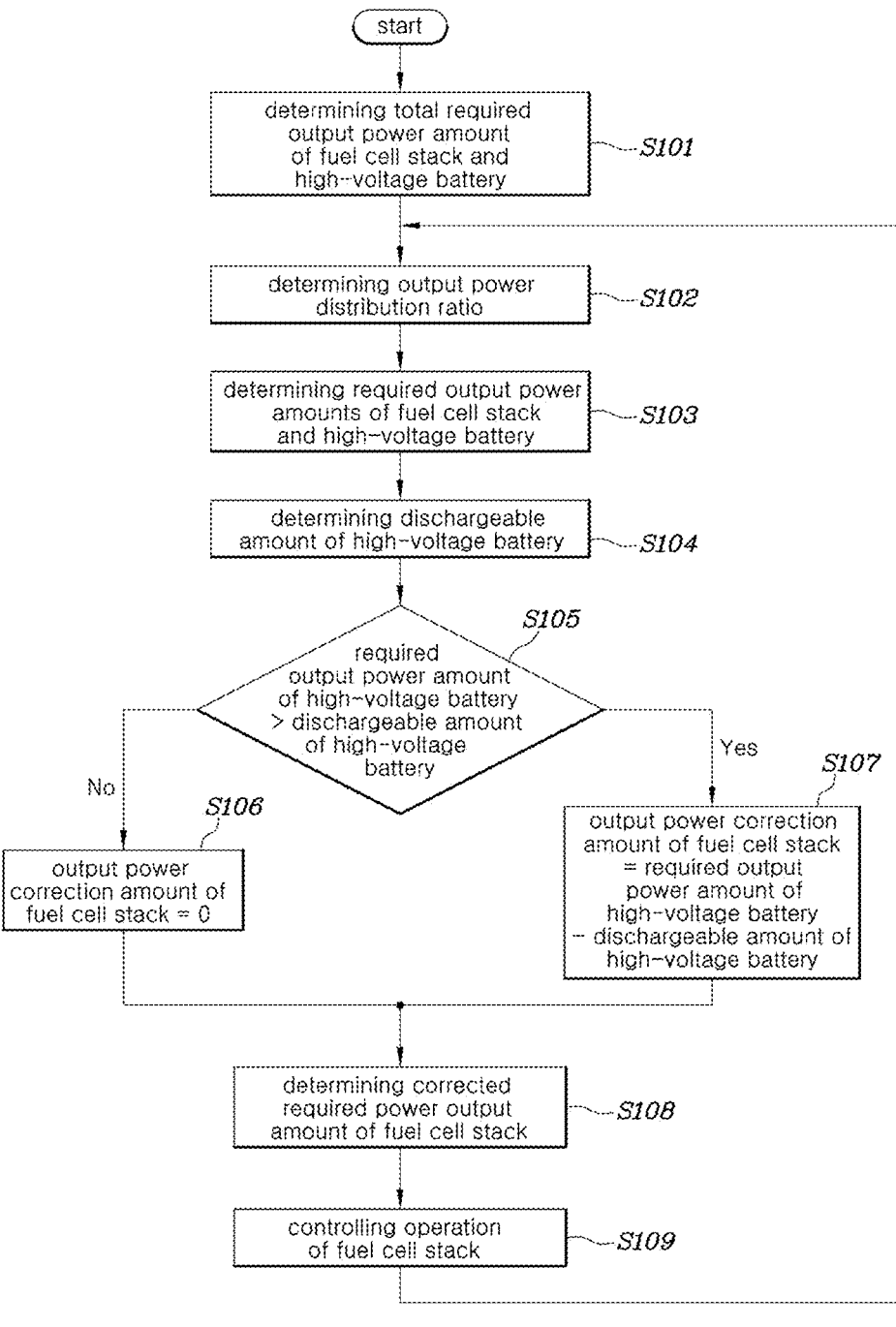
FIG. 2 is a flowchart illustrating a method of controlling a fuel cell electric vehicle according to an embodiment of the present invention.

Hereinafter, embodiments disclosed in the present application will be described in detail with reference to the accompanying drawings, in which identical or similar constituent elements are given the same reference numerals regardless of the reference numerals of the drawings, and repeated description thereof will be omitted.

In the description of embodiments of the present invention, when it is determined that the detailed description of the related art would obscure the gist of embodiments of the present invention, the detailed description thereof will be omitted. In addition, the accompanying drawings are merely intended to enable easy understanding of the embodiments disclosed herein, and thus the technical idea disclosed herein is not limited by the accompanying drawings, and it should be understood to include all changes, equivalents, and substitutions included in the idea and technical scope of the present invention.

In the description of the following embodiments, when a parameter is referred to as being "predetermined", it may be intended to mean that a value of the parameter is determined in advance when the parameter is used in a process or an algorithm. The value of the parameter may be set when the process or the algorithm starts or may be set during a period that the process or the algorithm is executed.

It will be understood that, although the terms "first," "second," etc., may be used herein to describe various elements, these elements should not be limited by these terms. These terms are only used to distinguish one element from another element.

It will be understood that when an element is referred to as being "coupled," "connected," or "linked" to another element, it can be directly coupled or connected to the other element or intervening elements may be present therebetween. In contrast, it should be understood that when an element is referred to as being "directly coupled," "directly connected," or "directly linked" to another element, there are no intervening elements present.

As used herein, the singular forms "a," "an," and "the" are intended to include the plural forms as well, unless the context clearly indicates otherwise.

It will be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

In addition, a unit or control unit included in names such as a fuel cell control unit (FCU) and a motor control unit (MCU) is a term widely used for naming a controller that controls a specific vehicle function, but does not mean a generic function unit. For example, each controller may include a communication device communicating with another controller or a sensor to control a corresponding function to which the controller is in charge, a memory storing an operating system (OS), logic commands, input/power information, and the like, and one or more processors performing determination, calculation, decision, and the like required for the control of the corresponding function.

Figure 1:
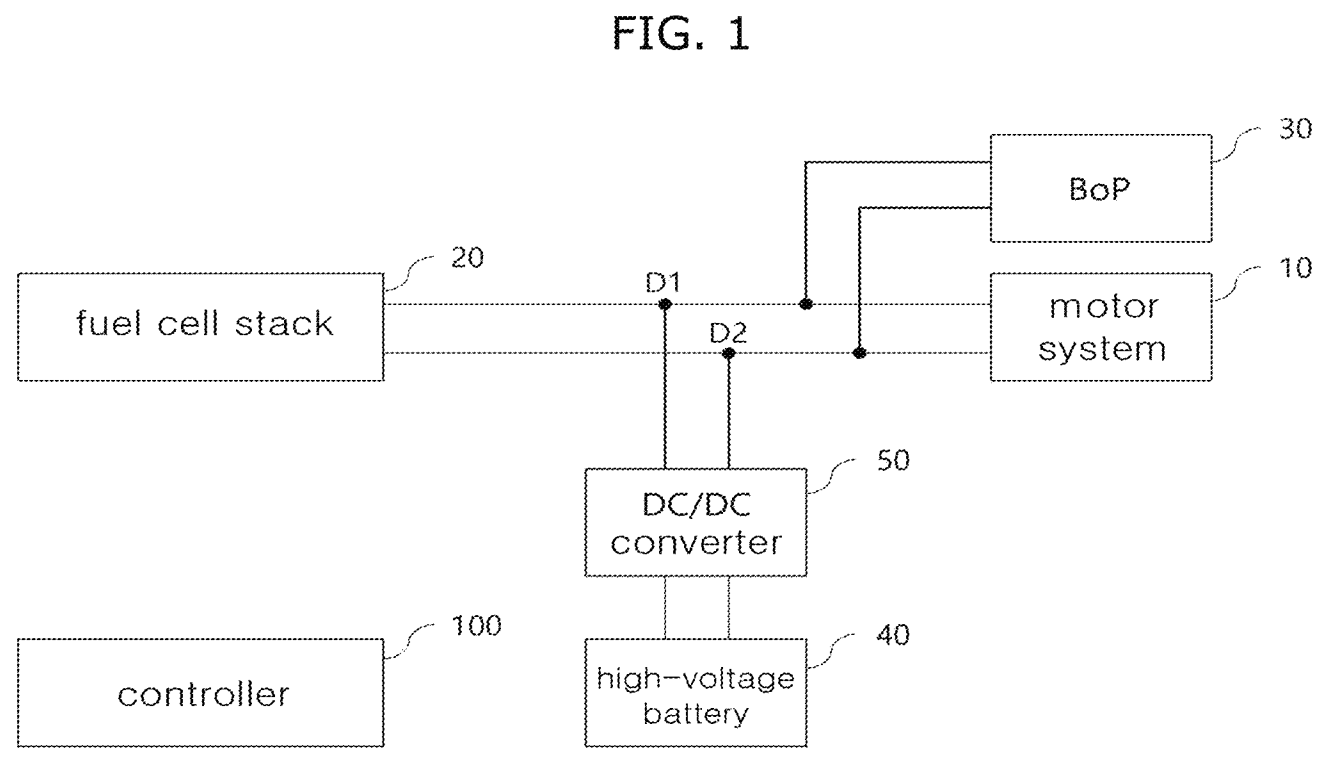

FIG. 1 is a block diagram illustrating the configuration of a power system of a fuel cell electric vehicle according to an embodiment of the present invention.

As illustrated in FIG. 1, the power system of the fuel cell electric vehicle may include a motor system 10, a fuel cell stack 20, a balance of plant (BoP) 30, a high-voltage battery 40, a DC/DC converter 50, and a controller 100.

The motor system 10 may include a driving motor having a plurality of windings corresponding to a plurality of phases and an inverter driving the driving motor on the basis of voltages between a DC link D1 and a DC link D2.

The fuel cell stack 20 has a stack structure in which a plurality of fuel cells are stacked. The fuel cell stack 20 may generate power through an electrochemical reaction between fuel (hydrogen) and air (oxygen) and transmit power to the DC links D1 and D2.

The BoP 30 is a peripheral mechanical/electronic device of the fuel cell stack 20 and may be operated on the basis of the voltage between the DC link D1 and the DC link D2.

The high-voltage battery 40 may be connected to the DC links D1 and D2 through the DC/DC converter 50.

The DC/DC converter 50 may be connected between the DC links D1 and D2 and the high-voltage battery 40. The DC/DC converter 50 may adjust the voltage between the DC link D1 and the DC link D2 on the basis of the voltage of the high-voltage battery 40 or charge the high-voltage battery 40 on the basis of the voltage between the DC link D1 and the DC link D2.

The controller 100 may distribute output power amounts of the fuel cell stack 20 and the high-voltage battery 40 by controlling the supply of fuel (hydrogen) and air (oxygen) of the fuel cell stack 20 and the operation of the DC/DC converter 50. The controller 100 may be implemented as a single controller or may be implemented in a form in which functions are distributed to a plurality of controllers. For example, the controller 100 may be implemented as a fuel cell control unit (FCU) or may be implemented as a combination of a fuel cell controller and a subordinate controller thereof, but is not necessarily limited thereto.

In the present embodiment, there is proposed a method in which the fuel cell electric vehicle adjusts the output power distribution ratio on the basis of a state of charge (SOC) of the high-voltage battery 40 through the controller 100, thereby stably managing the SOC of the high-voltage battery 40 and satisfying a required output power of a driving motor included in the motor system 10 regardless of the SOC of the high-voltage battery 40.

In addition, the controller 100 of the fuel cell electric vehicle according to the present embodiment may control the output power distribution ratio to be linearized in order to stabilize the output power of the fuel cell stack 20 and satisfy the required output power of the driving motor of the driving motor regardless of a discharge limit of the high-voltage battery 40. An operating method for the controller 100 is illustrated in FIG. 2.

FIG. 2 is a flowchart illustrating a method of controlling a fuel cell electric vehicle according to an embodiment of the present invention.

Referring to FIG. 2, a controller 100 may determine a required output power amount of a fuel cell stack 20 from a total required output power amount of the fuel cell stack 20 and a high-voltage battery 40 on the basis of an output power distribution ratio of the fuel cell stack 20 according to a current SOC value of the high-voltage battery 40 (S101 to S103).

In addition, the controller 100 may control the operation of the fuel cell stack 20 on the basis of the required output power amount of the fuel cell stack 20 (S104 to S109). More specifically, the controller 100 may determine a corrected required output power amount of the fuel cell stack 20 by adding an output power correction amount of the fuel cell stack 20 according to a dischargeable amount of the high-voltage battery 40 to the required output power amount of the fuel cell stack 20 (S104 to S108), and control the operation of the fuel cell stack 20 on the basis of the corrected required output power amount of the fuel cell stack 20 (S109).

Hereinafter, each step of S101 to S109 will be described in detail.

First, the controller 100 may determine the total required output power amount of the fuel cell stack 20 and the high-voltage battery 40 by adding a required output power amount of a driving motor included in the motor system 10 and a power consumption amount of the BoP 30 (S101).

Thereafter, the controller 100 may determine the output power distribution ratio on the basis of a target SOC error value of the high-voltage battery 40 and the total required output power amount calculated in S101 (S102). Here, the target SOC error value of the high-voltage battery 40 may correspond to a value obtained by subtracting the current SOC value of the high-voltage battery 40 from a target SOC value of the high-voltage battery 40. The output power distribution ratio may correspond to a ratio of the required output power amount of the fuel cell stack 20 to the total required output power amount.

More specifically, the controller 100 may adjust the output power distribution ratio of the fuel cell stack 20 to become higher as the target SOC error value of the high-voltage battery 40 increases. That is, since a required charge amount for charging the high-voltage battery 40 increases as the target SOC error value increases, the controller 100 may increase the output power distribution ratio of the fuel cell stack 20 to decrease a required output power amount of the high-voltage battery 40. On the contrary, since a required discharge amount for discharging the high-voltage battery 40 increases as the target SOC error value decreases, the controller 100 may decrease the output power distribution ratio of the fuel cell stack 20 to increase the required output power amount of the high-voltage battery 40. That is, by preemptively applying the SOC of the high-voltage battery 40 in determining the output power distribution ratio, the controller 100 according to the present embodiment may stably manage the SOC of the high-voltage battery 40, and satisfy the required output power of the driving motor regardless of the SOC of the high-voltage battery 40.

In addition, the controller 1000 may control the output power distribution ratio to be linearized on the basis of the total required output power amount calculated in S101 so that when the required output power amount of the driving motor reaches a set output power amount, the output power of the fuel cell stack 20 has continuity. At this time, the set output power amount may correspond to an output power amount of the driving motor at the time when the fuel cell stack 20 starts outputting power (that is, the time when the fuel cell stack 20 supports the driving motor to output power in conjunction with the high-voltage battery 40). Depending on embodiments, the set output power amount may have various values.

Thereafter, the controller 100 may determine the required output power amount of the fuel cell stack 20 by multiplying the total required output power amount calculated in S101 by the output power distribution ratio (S103). The required output power amount of the fuel cell stack 20 may increase as the target SOC error value of the high-voltage battery 40 and the total required output power amount increase. In addition, the controller 100 may determine the required output power amount of the high-voltage battery 40 by subtracting the required output power amount of the fuel cell stack 20 from the total required output power amount.

Meanwhile, when the dischargeable amount of the high-voltage battery 40 is smaller than the required output power amount of the high-voltage battery 40, the high-voltage battery 40 cannot satisfy the required output power amount thereof. Thus, the controller 100 according to the present embodiment may correct the required output power amount of the fuel cell stack 20 on the basis of the dischargeable amount of the high-voltage battery 40.

First, the controller 100 may determine the dischargeable amount of the high-voltage battery 40 to determine the output power correction amount of the fuel cell stack 20 (S104). More specifically, the controller 100 may set a smaller value among a dischargeable output power of the high-voltage battery 40 and an output power obtained by multiplying a dischargeable current of the high-voltage battery 40 by a voltage of the high-voltage battery 40 to be the dischargeable amount of the high-voltage battery 40.

Thereafter, the controller 100 may determine whether the required output power amount of the high-voltage battery 40 exceeds the dischargeable amount of the high-voltage battery 40 (S105).

When the required output power amount of the high-voltage battery 40 is less than or equal to the dischargeable amount of the high-voltage battery 40 (NO in S105), the controller 100 may set the output power correction amount of the fuel cell stack 20 to '0' (S106).

When the required output power amount of the high-voltage battery 40 exceeds the dischargeable amount of the high-voltage battery 40 (YES in S105), the controller 100 may set the output power correction amount of the fuel cell stack 20 by subtracting the dischargeable amount of the high-voltage battery 40 from the required output power amount of the high-voltage battery 40 (S107).

In S107, it has been described assuming that the dischargeable amount of the high-voltage battery 40 is a positive number. However, when the dischargeable amount of the high-voltage battery 40 is a negative number, that is, when charging of the high-voltage battery 40 is required, the controller 100 may set the required output power amount of the high-voltage battery 40 to be the output power correction amount of the fuel cell stack 20. That is, the output power correction amount of the fuel cell stack 20 may be calculated as illustrated in Equation 1 below according to embodiments.

$$\text{output power correction amount of fuel cell stack} = Wf^* \max(o, \min(\text{required output power amount of battery, required output power amount of battery} - \text{dischargeable amount of battery}))$$ Equation 1:

Here, 'Wf' may correspond to a weighting factor in which the output characteristics of the fuel cell stack 20 are reflected.

Thereafter, the controller 100 may determine the corrected required output power amount of the fuel cell stack 20 by adding the output power correction amount of the fuel cell stack 20 to the required output power amount of the fuel cell stack 20 (S108), and control the operation of the fuel cell stack 20 on the basis of the corrected required output power amount of the fuel cell stack 20 (S109).

The corrected required output power amount of the fuel cell stack 20 may be calculated as illustrated in Equation 2 below according to embodiments.

$$\text{corrected required output power amount of fuel cell stack} = B^* (\text{required output power amount of fuel cell stack} + \text{output power correction amount of fuel cell stack})$$ Equation 2:

Here, 'B' may correspond to a derating factor in which the output characteristics of the fuel cell stack are reflected.

Figure 3:
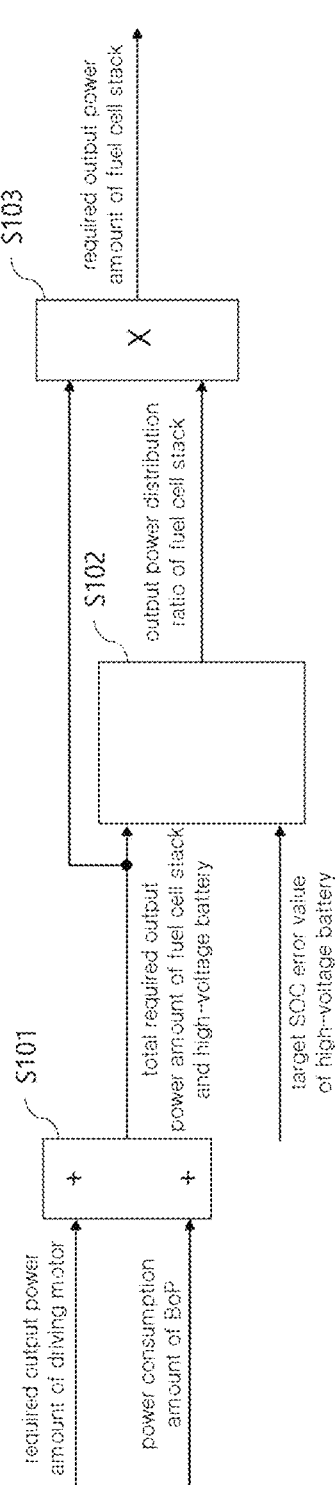
FIG. 3 is a view illustrating a process in which a controller determines a required output power amount of a fuel cell stack according to an embodiment of the present invention.

FIG. 3 is a view illustrating a process in which the controller 100 determines the required output power amount of the fuel cell stack 20 according to an embodiment of the present invention.

Referring to FIG. 3, the total required output power amount of the fuel cell stack 20 and the high-voltage battery 40 may be calculated by adding the required output power amount of the driving motor and the power consumption amount of the BoP 30 (S101).

The output power distribution ratio of the fuel cell stack 20 may be calculated on the basis of a function of the target SOC error value of the high-voltage battery 40 (i.e., a value obtained by subtracting the current SOC value of the high-voltage battery 40 from the target SOC value of the high-voltage battery 40) and the total required output power amount calculated in S101 (S102).

The required output power amount of the fuel cell stack 20 may be set to a value obtained by multiplying the total required output power amount calculated in S101 by the output power distribution ratio calculated in S102 (S103).

Figure 4:
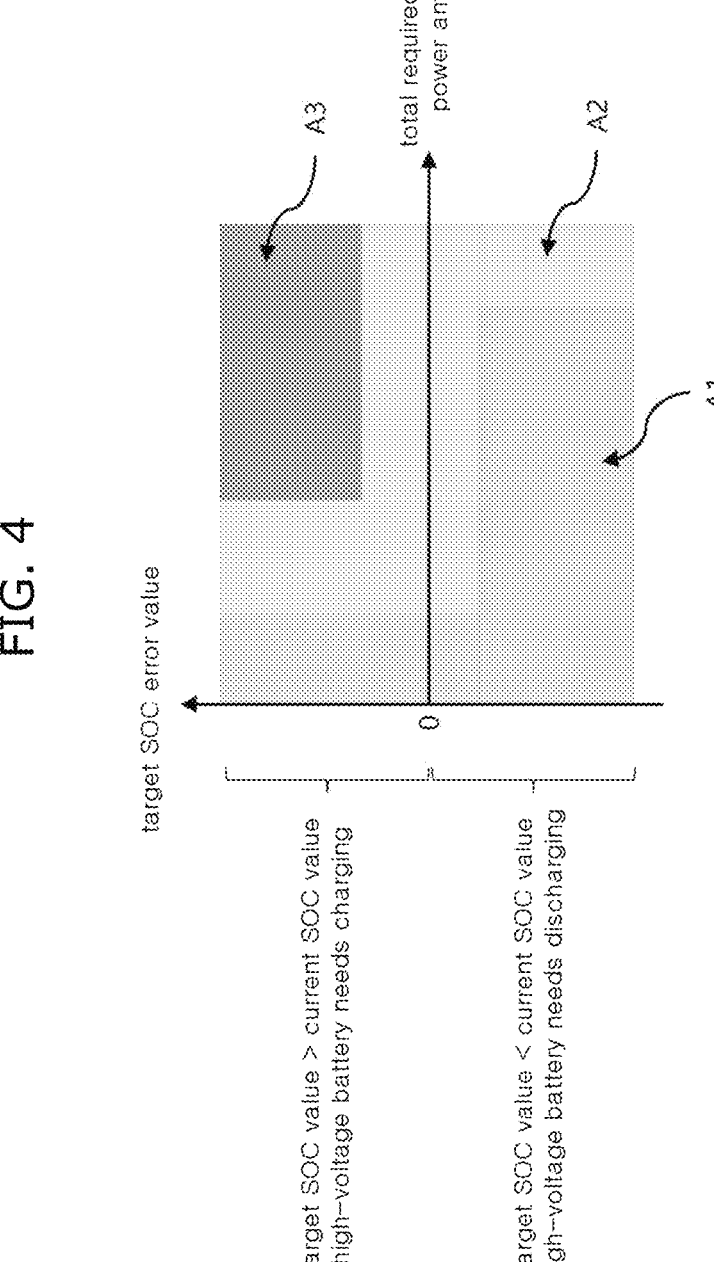
FIG. 4 is a view illustrating the required output power amount of the fuel cell stack according to an embodiment of the present invention.

FIG. 4 is a view illustrating the required output power amount of the fuel cell stack 20 according to an embodiment of the present invention.

Referring to FIG. 4, there is illustrated a distribution chart of the required output power amount of the fuel cell stack 20 according to the target SOC error value of the high-voltage battery 40 and the total required output power amount of the fuel cell stack 20 and the high-voltage battery 40.

Here, 'A1' may correspond to a region where the required output power amount of the fuel cell stack 20 is included in a first range, 'A2' may correspond to a region where the required output power amount of the fuel cell stack 20 is included in a second range higher than the first range, and 'A3' may correspond to a region where the required output power amount of the fuel cell stack 20 is included in a third range higher than the second range.

The target SOC error value is a positive number when the target SOC value of the high-voltage battery 40 is greater than the current SOC value of the high-voltage battery 40 (i.e., when the high-voltage battery 40 needs charging), and the target SOC error value is a negative number when the target SOC value of the high-voltage battery 40 is smaller than the current SOC value of the high-voltage battery 40 (i.e., when the high-voltage battery needs discharging).

The required output power amount of the fuel cell stack 20 may increase as the target SOC error value and the total required output power amount of the fuel cell stack 20 and the high-voltage battery 40 increase.

Figure 5:
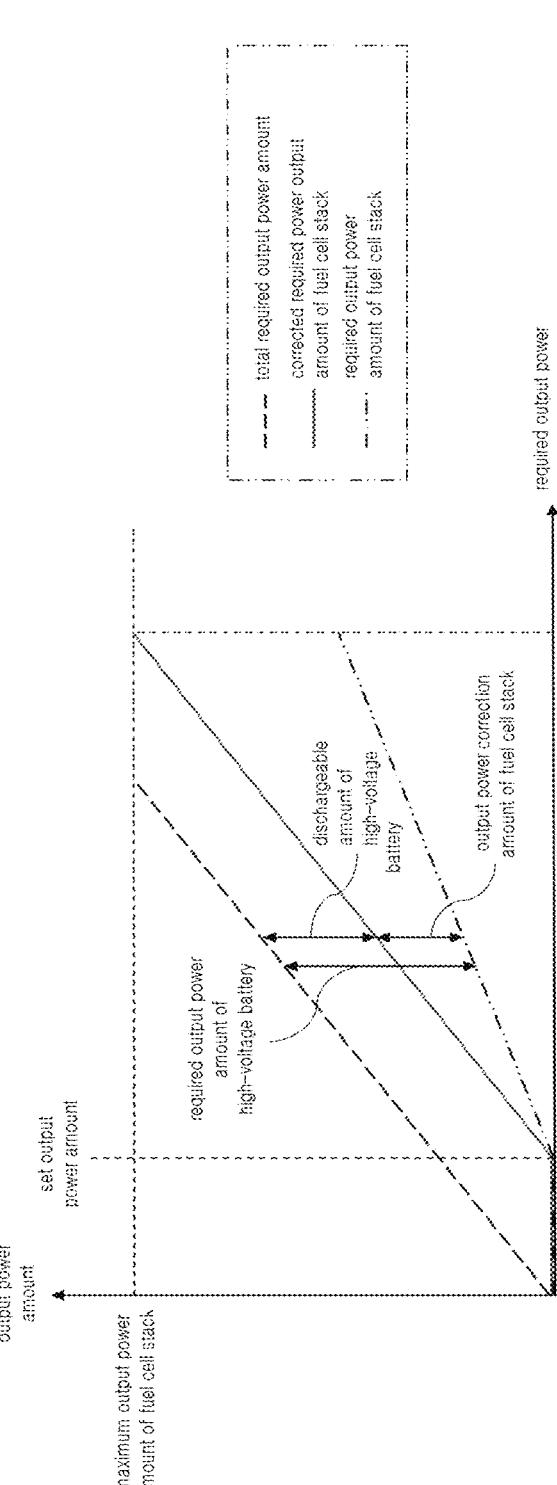
FIG. 5 is a view illustrating a process of distributing the output powers of the fuel cell stack and a high-voltage battery according to an embodiment of the present invention.

FIG. 5 is a view illustrating a process of distributing the output powers of the fuel cell stack 20 and the high-voltage battery 40 according to an embodiment of the present invention.

Referring to FIG. 5, in a section where the required output power amount of the driving motor is less than a set output power amount (i.e., the low output section), the required output power amount of the driving motor may be satisfied with the required output power amount of the high-voltage battery 40. In a section where the required output power amount of the driving motor is equal to or greater than the set output power amount (i.e., a high output section), the required output power amount of the driving motor may be satisfied by distributing the required output power amount of the fuel cell stack 20 and the required output power amount of the high-voltage battery 40 according to the output power distribution ratio.

Here, since the output power distribution ratio is linearized before and after the set output power amount, the required output power amount of the fuel cell stack 20 may also have continuity before and after the set output power amount. Thus, the fuel cell stack 20 may achieve a stable output power.

In addition, when the required output power amount of the high-voltage battery 40 exceeds the dischargeable amount of the high-voltage battery 40, the output power correction amount of the fuel cell stack 20 may be set to be a value obtained by subtracting the dischargeable amount of the high-voltage battery 40 from the required output power amount of the high-voltage battery 40. Thus, even when the required output power amount of the high-voltage battery 40 exceeds the dischargeable amount of the high-voltage battery 40, the total required output power amount may be satisfied with the output powers of the fuel cell stack 20 and the high-voltage battery 40.

As described above, according to embodiments of the present invention, by setting the required output power amounts of the fuel cell stack and the high-voltage battery on the basis of the output power distribution ratio according to the SOC of the high-voltage battery, it is possible to stably manage the SOC of the high-voltage battery and satisfy the required output power of the driving motor regardless of the SOC of the high-voltage battery.

In addition, by controlling the output power distribution ratio to be linearized, it is possible to stabilize the output power of the fuel cell stack under the condition in which the output power of the driving motor is equal to the set output power.

In addition, by correcting the required output power amount of the fuel cell stack according to the dischargeable amount of the high-voltage battery, it is possible to satisfy the required output power of the driving motor regardless of the discharge limit of the high-voltage battery.

Meanwhile, embodiments of the present invention as described above can be implemented in a program recorded medium as computer-readable codes. The computer-readable media include all kinds of recording devices in which data readable by a computer system are stored, such as a hard disk drive (HDD), a solid state disk (SSD), a silicon disk drive (SDD), a ROM, a RAM, a CD-ROM, magnetic tapes, floppy disks, optical data storage devices, and the like. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

What is claimed is:

1. A method of controlling a fuel cell electric vehicle, the method comprising:
   determining an output power distribution ratio based on a target state of charge (SOC) error value of a battery and a total required output power amount, wherein the target SOC error value corresponds to a value obtained by subtracting a current SOC value from a target SOC value of the battery;
   determining a required output power amount of a fuel cell stack from the total required output power amount of the battery and the fuel cell stack based on the output power distribution ratio of the fuel cell stack according to the current SOC value of the battery; and
   controlling an operation of the fuel cell stack based on the required output power amount of the fuel cell stack.

2. The method of claim 1, further comprising determining the total required output power amount by adding a required output power amount of a driving motor and a power consumption amount of a balance of plant (BoP).

3. The method of claim 1, wherein determining the output power distribution ratio comprises adjusting the output power distribution ratio to become higher as the target SOC error value increases.

4. The method of claim 1, wherein determining the output power distribution ratio comprises controlling the output power distribution ratio to be linearized based on the total required output power amount.

5. The method of claim 1, wherein determining the required output power amount of the fuel cell stack is performed to determine the required output power amount of the fuel cell stack by multiplying the total required output power amount by the output power distribution ratio.

6. The method of claim 1, wherein controlling the operation of the fuel cell stack comprises:

determining a corrected required output power amount of the fuel cell stack by adding an output power correction amount of the fuel cell stack according to a dischargeable amount of the battery to the required output power amount of the fuel cell stack; and controlling the operation of the fuel cell stack based on the corrected required output power amount.

7. The method of claim 6, further comprising:

when a required output power amount of the battery exceeds the dischargeable amount of the battery, setting the output power correction amount by subtracting the dischargeable amount of the battery from the required output power amount of the battery; and when the required output power amount of the battery is less than or equal to the dischargeable amount, setting the output power correction amount to '0'.

8. The method of claim 7, further comprising determining the required output power amount of the battery by subtracting the required output power amount of the fuel cell stack from the total required output power amount.

9. A fuel cell electric vehicle comprising:

a fuel cell stack;

a battery; and a controller configured to:

determine an output power distribution ratio based on a target state of charge (SOC) error value of the battery and a total required output power amount, wherein the target SOC error value corresponds to a value obtained by subtracting a current SOC value from a target SOC value of the battery;

determine a required output power amount of the fuel cell stack from the total required output power amount of the battery and the fuel cell stack based on the output power distribution ratio of the fuel cell stack according to the current SOC value of the battery; and control an operation of the fuel cell stack based on the required output power amount of the fuel cell stack.

10. The fuel cell electric vehicle of claim 9, wherein the controller is configured to determine the total required output power amount by adding a required output power amount of a driving motor and a power consumption amount of a balance of plant (BoP).

11. The fuel cell electric vehicle of claim 9, wherein the controller is configured to adjust the output power distribution ratio to become higher as the target SOC error value increases.

12. The fuel cell electric vehicle of claim 9, wherein the controller is configured to control the output power distribution ratio to be linearized based on the total required output power amount.

13. The fuel cell electric vehicle of claim 9, wherein the controller is configured to determine the required output power amount of the fuel cell stack by multiplying the total required output power amount by the output power distribution ratio.

14. A fuel cell electric vehicle comprising:

a fuel cell stack;

a battery; and a controller configured to:

determine an output power distribution ratio based on a target state of charge (SOC) error value of the battery and a total required output power amount, wherein the target SOC error value corresponds to a value obtained by subtracting a current SOC value from a target SOC value of the battery;

determine a required output power amount of the fuel cell stack from the total required output power amount of the battery and the fuel cell stack based on the output power distribution ratio of the fuel cell stack according to the current SOC value of the battery;

control an operation of the fuel cell stack based on the required output power amount of the fuel cell stack;

determine a corrected required output power amount of the fuel cell stack by adding an output power correction amount of the fuel cell stack according to a dischargeable amount of the battery to the required output power amount of the fuel cell stack; and control the operation of the fuel cell stack based on the corrected required output power amount.

15. The fuel cell electric vehicle of claim 14, wherein:

when a required output power amount of the battery exceeds the dischargeable amount of the battery, the controller is configured to set the output power correction amount by subtracting the dischargeable amount of the battery from the required output power amount of the battery; and when the required output power amount of the battery is less than or equal to the dischargeable amount, the controller is configured to set the output power correction amount to '0'.

16. The fuel cell electric vehicle of claim 15, wherein the controller is configured to determine the required output power amount of the battery by subtracting the required output power amount of the fuel cell stack from the total required output power amount.

17. The fuel cell electric vehicle of claim 14, wherein the controller is further configured to determine the output power correction amount by setting the output power correction amount to a value obtained by subtracting the dischargeable amount of the battery from the required output power amount of the battery when the required output power amount of the battery exceeds the dischargeable amount of the battery, and setting the output power correction amount to zero when the required output power amount of the battery is less than or equal to the dischargeable amount of the battery.

18. The fuel cell electric vehicle of claim 14, wherein the controller is further configured to determine the dischargeable amount of the battery by selecting a smaller value among a dischargeable output power of the battery and an output power obtained by multiplying a dischargeable current of the battery by a voltage of the battery.

19. The fuel cell electric vehicle of claim 9, wherein the controller is further configured to determine a dischargeable amount of the battery by selecting a smaller value among a dischargeable output power of the battery and an output power obtained by multiplying a dischargeable current of the battery by a voltage of the battery.

20. The fuel cell electric vehicle of claim 9, wherein the controller is further configured to determine the required output power amount of the fuel cell stack such that the required output power amount of the fuel cell stack increases as the target SOC error value of the battery increases and as the total required output power amount increases.

* * * * *